(12) United States Patent
Calvarese

(10) Patent No.: US 7,619,524 B2
(45) Date of Patent: Nov. 17, 2009

(54) IDENTIFYING RFID TAG MOVING COHERENTLY WITH READER

(75) Inventor: Russell Calvarese, Stonybrook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 307 days.

(21) Appl. No.: 11/781,026

(22) Filed: Jul. 20, 2007

(65) Prior Publication Data

US 2009/0021376 A1    Jan. 22, 2009

(51) Int. Cl.
*G08B 13/14* (2006.01)
(52) U.S. Cl. .................. 340/572.1; 340/539.23
(58) Field of Classification Search ............. 340/572.1, 340/572.2, 572.7, 10.1, 539.23
See application file for complete search history.

(56) References Cited

U.S. PATENT DOCUMENTS 7,154,395 B2 * 12/2006 Raskar et al. .......... 340/539.23
7,183,922 B2 * 2/2007 Mendolia et al. ......... 340/572.1
2008/0007410 A1 * 1/2008 Rosenbaum et al. ...... 340/572.1
2008/0048864 A1 * 2/2008 Mayhew ................. 340/572.1

* cited by examiner

*Primary Examiner*—John A Tweel, Jr.

(57) ABSTRACT

A system and method to distinguish an RFID tag which is moving synchronously with an RFID reader from other RFID tags which are not moving synchronously with the reader. In one embodiment, the reader emits read signals at a fixed frequency with a corresponding period. A determination is made by the RFID reader as to the signal strengths received from an RFID tag at time intervals which are integer multiples of the half-period of the signal. Signal strengths from the tag which are the same or substantially the same at these prescribed measurement intervals are taken as an indication that the tag is moving synchronously with the RFID reader. In an alternative embodiment, the frequency of the read signals may vary over time. Correlations between received tag signal strengths with particular frequencies are an indication that the RFID tag is moving synchronously with the RFID reader.

22 Claims, 13 Drawing Sheets

Correlated: Reader and Tag Moving Synchronously

Uncorrelated: Reader and Tag NOT Moving Synchronously

IDENTIFYING RFID TAG MOVING COHERENTLY WITH READER

BACKGROUND

The invention relates in general to the use of radio frequency identification (RFID) tags. In particular, the inventions relate to identifying one or more RFID tags that are moving along with a moving RFID reader.

Radio frequency identification (RFID) tags are electronic devices that may be affixed to items whose presence is to be detected and/or monitored. RFID tags are classified based on standards defined by national and international standards bodies (e.g., EPCGlobal and ISO). Standard tag classes include Class 0, Class 1, and Class 1 Generation 2 (referred to herein as "Gen 2"). The presence of an RFID tag, and therefore the presence of the item to which the tag is affixed, may be checked and monitored wirelessly by an "RFID reader", also known as a "reader-interrogator", "interrogator", or simply "reader." Readers typically have one or more antennas for transmitting radio frequency signals to RFID tags and receiving responses from them. An RFID tag within range of a reader-transmitted signal responds with a signal including a unique identifier.

With the maturation of RFID technology, efficient communication between tags and readers has become a key enabler in supply chain management, especially in manufacturing, shipping, and retail industries, as well as in building security installations, healthcare facilities, libraries, airports, warehouses etc.

Unlike bar codes, which are read in a line of sight by a laser reader, RFID tags are read wirelessly and not necessarily in a line of sight. This is an advantage in situations where there are tags affixed to objects that can not be seen, such as boxes stacked in a warehouse. An RFID reader in proximity of the tags senses them regardless of whether or not they can be "seen". Although this is an advantage in managing many types of packages and materials, it is a disadvantage in one respect. Because RFID tags are read wirelessly using radio signals, it is not easy to identify particular tags that are moving coherently (synchronously) with a reader. For example, a forklift operator carrying a reader with him moves a pallet of goods, marked by an RFID tag affixed to the pallet, in a warehouse from point A to point B. There are hundreds of pallets in the warehouse. It may be useful to know which pallet is being moved at that particular time. One way of accomplishing this type of task is to read all tags within range at a point in time. Later, after one or more tags has been moved, the universe of tags remaining is read. Those that produce a read the second time have not been moved and can be subtracted from the universe of tags previously read. Tags that did not read are presumed to have been moved. This process is not convenient for many object management situations.

What is needed is a way of easily and quickly determining which tags are being moved along with an RFID reader in contrast to those tags that are not being moved or are being moved other than along with the RFID reader.

SUMMARY

This section is for the purpose of summarizing some aspects of the inventions described more fully in other sections of this patent document. It briefly introduces some preferred embodiments. Simplifications or omissions may be made to avoid obscuring the purpose of the section. Such simplifications or omissions are not intended to limit the scope of the claimed inventions.

The inventions described in this patent document relate in general to identifying one or more RFID tags that may be moving along with a mobile reader. For example, an RFID tag affixed to a pallet of goods in a warehouse may be moved by a forklift operator carrying or wearing a reader. Using the techniques described herein, the pallet in motion can easily be distinguished from those that remain stationary or a moving other than with the reader. In this patent document, movement along with a reader is considered to be "coherent" motion.

The inventions can be implemented in numerous ways, including methods, systems, devices, and computer readable medium. Several embodiments of the inventions are discussed below, but they are not the only ways to practice the inventions described herein.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION

In the following description, numerous specific details are set forth in order to provide a thorough understanding of the present invention. However, it will become obvious to those skilled in the art that the present invention may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
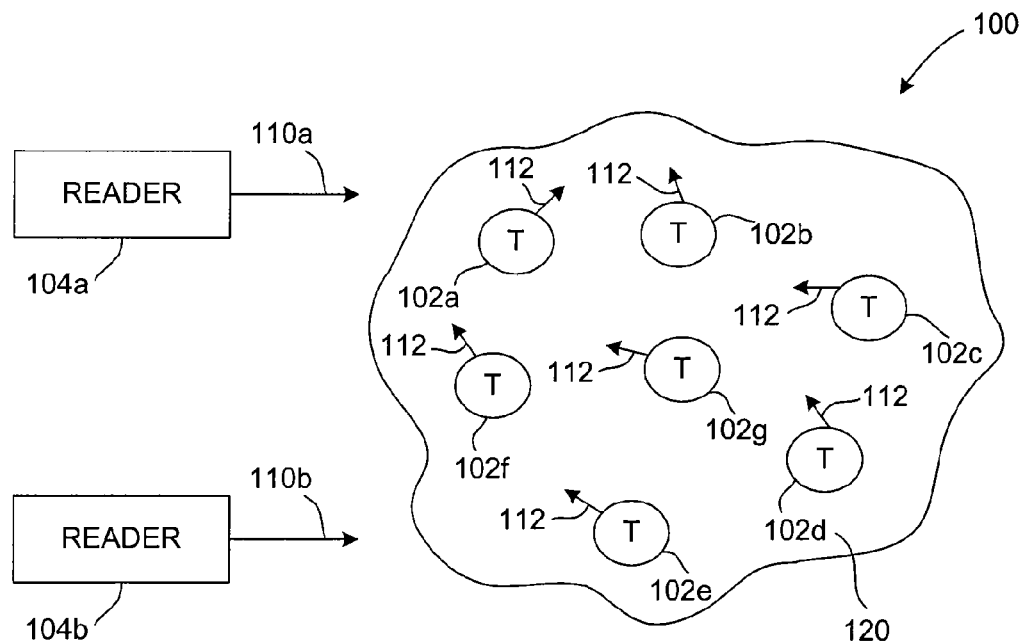
FIG. 1 shows an environment where RFID readers communicate with an exemplary population of RFID tags.

1. Exemplary Operating Environment
2. Overview of Methods To Identify An RFID Tag Moving Coherently With Reader
3. First Exemplary Method To Identify An RFID Tag Moving Coherently With Reader
4. Second Exemplary Method To Identify An RFID Tag Moving Coherently With Reader
5. Third Exemplary Method To Identify An RFID Tag Moving Coherently With Reader
6. Fourth Exemplary Method To Identify An RFID Tag Moving Coherently With Reader
7. Conclusion 1. Exemplary Operating Environment Before describing embodiments of the inventions in detail, it is helpful to describe an example RFID communications environment in which the inventions may be implemented. FIG. 1 illustrates an environment 100 where RFID tag readers 104 (readers 104a and 104b shown in FIG. 1) communicate with an exemplary population 120 of RFD tags 102. As shown in FIG. 1, the population 120 of tags includes seven tags 102a-102g. A population 120 may include any number of tags 102.

Environment 100 includes any number of one or more readers 104. For example, environment 100 includes a first reader 104a and a second reader 104b. Readers 104a and/or 104b may be requested by an external application to address the population of tags 120. Alternatively, reader 104a and/or reader 104b may have internal logic that initiates communication, or may have a trigger mechanism that an operator of a reader 104 uses to initiate communication. Readers 104a and 104b may also communicate with each other in a reader network (see FIG. 2).

As shown in FIG. 1, reader 104a "reads" tags 120 by transmitting an interrogation signal 110a to the population of tags 120. Interrogation signals may have signal carrier frequencies or may comprise a plurality of signals transmitted in a frequency hopping arrangement. Readers 104a and 104b typically operate in one or more of the frequency bands allotted for this type of RF communication. For example, the Federal Communication Commission (FCC) defined frequency bands of 902-928 MHz and 2400-2483.5 MHz for certain RFID applications.

Tag population 120 may include tags 102 of various types, such as, for example, various classes of tags as enumerated above. Thus, in response to interrogation signals, the various tags 102 may transmit one or more response signals 112 to an interrogating reader 104. Some of the tags, for example, may respond by alternatively reflecting and absorbing portions of signal 104 according to a time-based pattern or frequency. This technique for alternatively absorbing and reflecting signal 104 is referred to herein as backscatter modulation. Typically, such backscatter modulation may include one or more alpha-numeric characters that uniquely identify a particular tag. Readers 104a and 104b receive and obtain data from response signals 112, such as an identification number of the responding tag 102. In the embodiments described herein, a reader may be capable of communicating with tags 102 according to various suitable communication protocols, including Class 0, Class 1, EPC Gen 2, other binary traversal protocols and slotted aloha protocols, and any other protocols mentioned elsewhere herein, and future communication protocols. Additionally, tag population 120 may include one or more tags having the packed object format described herein and/or one or more tags not using the packed object format (e.g., standard ISO tags).

Figure 2:
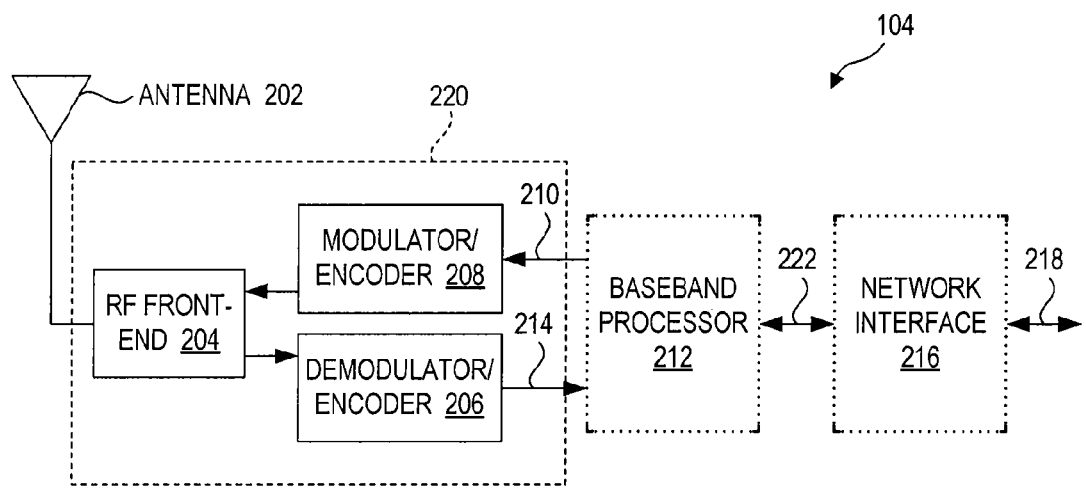
FIG. 2 shows a block diagram of receiver and transmitter portions of an RFID reader.

FIG. 2 shows a block diagram of an example RFID reader 104. Reader 104 includes one or more antennas 202, a receiver and transmitter portion 220 (also referred to as transceiver 220), a baseband processor 212, and a network interface 216. These components of reader 104 may include software, hardware, and/or firmware, or any combination thereof, for performing their functions.

Baseband processor 212 and network interface 216 are optionally present in reader 104. Baseband processor 212 may be present in reader 104, or may be located remote from reader 104. For example, in an embodiment, network interface 216 may be present in reader 104, to communicate between transceiver portion 220 and a remote server that includes baseband processor 212. When baseband processor 212 is present in reader 104, network interface 216 may be optionally present to communicate between baseband processor 212 and a remote server. In another embodiment, network interface 216 is not present in reader 104.

In an embodiment, reader 104 includes network interface 216 to interface reader 104 with a communications network 218. As shown in FIG. 2, baseband processor 212 and network interface 216 communicate with each other via a communication link 222. Network interface 216 is used to provide an interrogation request 210 to transceiver portion 220 (optionally through baseband processor 212), which may be received from a remote server coupled to communications network 218. Baseband processor 212 optionally processes the data of interrogation request 210 prior to being sent to transceiver portion 220. Transceiver 220 transmits the interrogation request via antenna 202.

Reader 104 has at least one antenna 202 for communicating with tags 102 and/or other readers 104. Antenna(s) 202 may be any type of reader antenna known to persons skilled in the relevant art(s), including for example and without limitation, a vertical, dipole, loop, Yagi-Uda, slot, and patch antenna type.

Transceiver 220 receives a tag response via antenna 202. Transceiver 220 outputs a decoded data signal 214 generated from the tag response. Network interface 216 is used to transmit decoded data signal 214 received from transceiver portion 220 (optionally through baseband processor 212) to a remote server coupled to communications network 218. Baseband processor 212 optionally processes the data of decoded data signal 214 prior to being sent over communications network 218.

In embodiments, network interface 216 enables a wired and/or wireless connection with communications network 218. For example, network interface 216 may enable a wireless local area network (WLAN) link (including a IEEE 802.11 WLAN standard link), a BLUETOOTH link, and/or other types of wireless communication links. Communications network 218 may be a local area network (LAN), a wide area network (WAN) (e.g., the Internet), and/or a personal area network (PAN).

In embodiments, a variety of mechanisms may be used to initiate an interrogation request by reader 104. For example, an interrogation request may be initiated by a remote computer system/server that communicates with reader 104 over communications network 218. Alternatively, reader 104 may include a finger-trigger mechanism, a keyboard, a graphical user interface (GUI), and/or a voice activated mechanism with which a user of reader 104 may interact to initiate an interrogation by reader 104.

In the example of FIG. 2, transceiver portion 220 includes a RF front-end 204, a demodulator/decoder 206, and a modulator/encoder 208. These components of transceiver 220 may include software, hardware, and/or firmware, or any combination thereof, for performing their functions. Example description of these components is provided as follows.

Modulator/encoder 208 receives interrogation request 210, and is coupled to an input of RF front-end 204. Modulator/encoder 208 encodes interrogation request 210 into a signal format, such as, for example, one of pulse-interval encoding (PIE), FM0, or Miller encoding formats, modulates the encoded signal, and outputs the modulated encoded interrogation signal to RF front-end 204.

RF front-end 204 may include one or more antenna matching elements, amplifiers, filters, an echo-cancellation unit, a down-converter, and/or an up-converter. RF front-end 204 receives a modulated encoded interrogation signal from modulator/encoder 208, up-converts (if necessary) the interrogation signal, and transmits the interrogation signal to antenna 202 to be radiated. Furthermore, RF front-end 204 receives a tag response signal through antenna 202 and down-converts (if necessary) the response signal to a frequency range amenable to further signal processing.

Demodulator/decoder 206 is coupled to an output of RF front-end 204, receiving a modulated tag response signal from RF front-end 204. In an EPC Gen 2 protocol environment, for example, the received modulated tag response signal may have been modulated according to amplitude shift keying (ASK) or phase shift keying (PSK) modulation techniques. Demodulator/decoder 206 demodulates the tag response signal. For example, the tag response signal may include backscattered data formatted according to FM0 or Miller encoding formats in an EPC Gen 2 embodiment. Demodulator/decoder 206 outputs decoded data signal 214.

The configuration of transceiver 220 shown in FIG. 2 is provided for purposes of illustration, and is not intended to be limiting. Transceiver 220 may be configured in numerous ways to modulate, transmit, receive, and demodulate RFID communication signals, as would be known to persons skilled in the relevant art(s).

Figure 3:
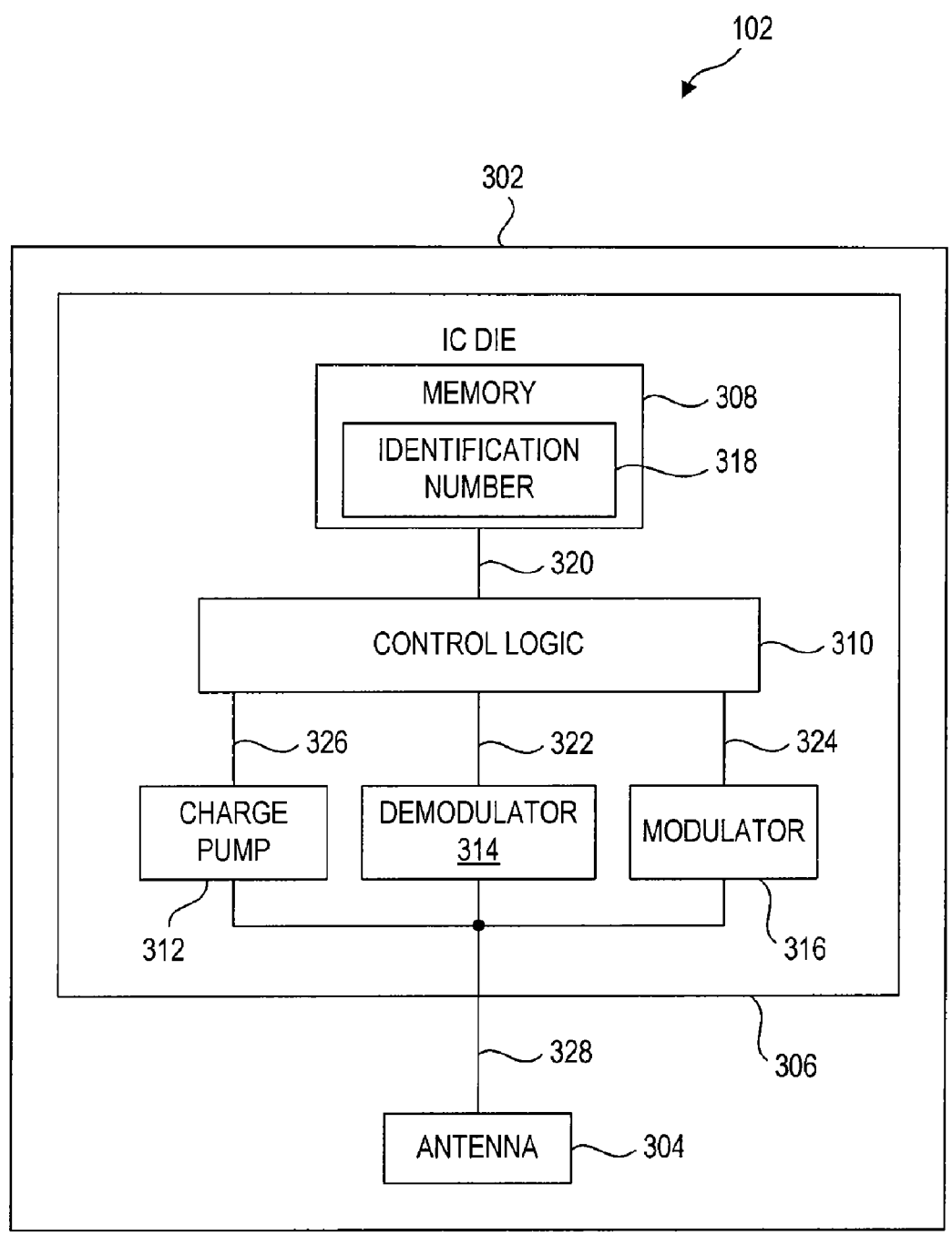
FIG. 3 shows a block diagram of an exemplary radio frequency identification (RFID) tag.

The inventions described herein are applicable to any type of RFID tag. FIG. 3 is a schematic block diagram of an example radio frequency identification (RFID) tag 102. Tag 102 includes a substrate 302, an antenna 304, and an integrated circuit (IC) 306. Antenna 304 is formed on a surface of substrate 302. Antenna 304 may include any number of one, two, or more separate antennas of any suitable antenna type, including for example dipole, loop, slot, and patch. IC 306 includes one or more integrated circuit chips/dies, and can include other electronic circuitry. IC 306 is attached to substrate 302, and is coupled to antenna 304. IC 306 may be attached to substrate 302 in a recessed and/or non-recessed location.

IC 306 controls operation of tag 102, and transmits signals to, and receives signals from RFID readers using antenna 304. In the example of FIG. 3, IC 306 includes a memory 308, a control logic 310, a charge pump 312, a demodulator 314, and a modulator 316. Inputs of charge pump 312, and demodulator 314, and an output of modulator 316 are coupled to antenna 304 by antenna signal 328.

Demodulator 314 demodulates a radio frequency communication signal (e.g., interrogation signal 110) on antenna signal 328 received from a reader by antenna 304. Control logic 310 receives demodulated data of the radio frequency communication signal from demodulator 314 on an input signal 322. Control logic 310 controls the operation of RFID tag 102, based on internal logic, the information received from demodulator 314, and the contents of memory 308. For example, control logic 310 accesses memory 308 via a bus 320 to determine whether tag 102 is to transmit a logical "1" or a logical "0" (of identification number 318) in response to a reader interrogation. Control logic 310 outputs data to be transmitted to a reader (e.g., response signal 112) onto an output signal 324. Control logic 310 may include software, firmware, and/or hardware, or any combination thereof. For example, control logic 310 may include digital circuitry, such as logic gates, and may be configured as a state machine in an embodiment.

Modulator 316 is coupled to antenna 304 by antenna signal 328, and receives output signal 324 from control logic 310. Modulator 316 modulates data of output signal 324 (e.g., one or more bits of identification number 318) onto a radio frequency signal (e.g., a carrier signal transmitted by reader 104) received via antenna 304. The modulated radio frequency signal is response signal 112 (see FIG. 1), which is received by reader 104. In one example embodiment, modulator 316 includes a switch, such as a single pole, single throw (SPST) switch. The switch is configured in such a manner as to change the return loss of antenna 304. The return loss may be changed in any of a variety of ways. For example, the RF voltage at antenna 304 when the switch is in an "on" state may be set lower than the RF voltage at antenna 304 when the switch is in an "off" state by a predetermined percentage (e.g., 30 percent). This may be accomplished by any of a variety of methods known to persons skilled in the relevant art(s).

Charge pump 312 (or other type of power generation module) is coupled to antenna 304 by antenna signal 328. Charge pump 312 receives a radio frequency communication signal (e.g., a carrier signal transmitted by reader 104) from antenna 304, and generates a direct current (DC) voltage level that is output on tag power signal 326. Tag power signal 326 powers circuits of IC die 306, including control logic 320.

Charge pump 312 rectifies a portion of the power of the radio frequency communication signal of antenna signal 328 to create a voltage power. Charge pump 312 increases the voltage level of the rectified power to a level sufficient to power circuits of IC die 306. Charge pump 312 may also include a regulator to stabilize the voltage of tag power signal 326. Charge pump 312 may be configured in any suitable way known to persons skilled in the relevant art(s). For description of an example charge pump applicable to tag 102, refer to U.S. Pat. No. 6,734,797, titled "Identification tag Utilizing Charge Pumps for Voltage Supply Generation and Data Recovery," which is incorporated by reference herein in its entirety. Alternative circuits for generating power in a tag, as would be known to persons skilled in the relevant art(s), may be present. Further description of charge pump 312 is provided below.

It will be recognized by persons skilled in the relevant art(s) that tag 102 may include any number of modulators, demodulators, charge pumps, and antennas. Tag 102 may additionally include further elements, including an impedance matching network and/or other circuitry. Furthermore, although tag 102 is shown in FIG. 3 as a passive tag, tag 102 may alternatively be an active tag (e.g., powered by battery).

Memory 308 is typically a non-volatile memory, but can alternatively be a volatile memory, such as a DRAM. Memory 308 stores data, including an identification number 318. In a Gen-2 tag, tag memory 308 may be logically separated into four memory banks.

2. Overview of Methods to Identify an RFID Tag Moving Coherently with Reader

The following sections of this specification, along with FIGS. 4 through 9, describe exemplary embodiments that incorporate the features of the inventions. The embodiment(s) described, and references in the specification to "exemplary embodiment", "one embodiment", "an embodiment", "an example embodiment", etc., indicate that the embodiment(s) described may include a particular procedure, operation, step, feature, structure, or characteristic, but every embodiment may not necessarily include the particular procedure, operation, step, feature, structure, or characteristic. Moreover, such phrases are not necessarily referring to the same embodiment. Further, when a particular procedure, operation, step, feature, structure, or characteristic is described in connection with an embodiment, it is understood that it is within the knowledge of one skilled in the art to effect such procedure, operation, step, feature, structure, or characteristic in connection with other embodiments whether or not explicitly described.

One or more embodiments of the inventions are now described. While specific methods and configurations are discussed, it should be understood that this is done for illustration purposes only. A person skilled in the art will recognize that other configurations and procedures may be used without departing from the spirit and scope of the invention.

In particular, the inventions are described in the context of an environment where an RFID reader may be in motion while reading RFID tags which may or may not be in motion in relation to the RFID reader. Persons skilled in the relevant arts will recognize that the elements, methods, techniques, and principles of the inventions may be applied, with suitable modifications, to other kinds of RF systems suitable for identifying a radio frequency marker.

3. First Exemplary Method to Identify an RFID Tag Moving Coherently with Reader

Figure 4A:
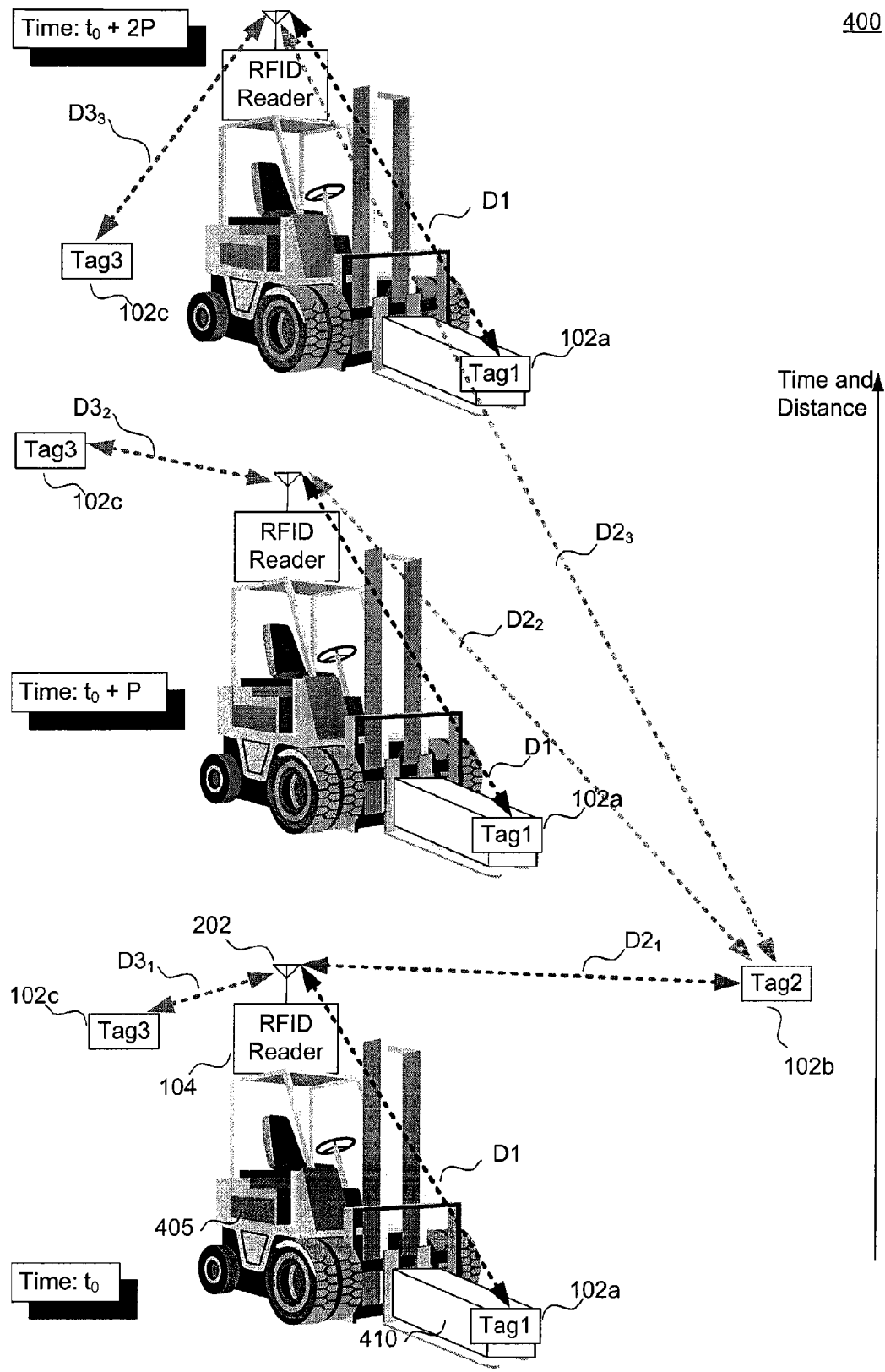
FIG. 4A illustrates an exemplary environment where an RFID reader is being moved over some distance, and where a first RFID tag is in synchronous motion with the RFID reader, while a second and third RFID tag are not in synchronous motion with respect to the RFID reader.

FIG. 4A illustrates an exemplary environment 400 which may, for example, be a warehouse or other facility where an RFID reader 104 moves along with a piece of equipment or by being carried/worn by an operator. Exemplary environment 400 may have, for example, a vehicle 405 such as the forklift pictured, used for moving items within a warehouse. Vehicle 405 has associated with it an exemplary RFID reader 104 with RFID reader antenna 202.

FIG. 4A shows three snapshots in time of the movement of vehicle 405 with RFID reader 104, specifically starting at time $t_0$, continuing through time $t_0+P$, and then continuing until time $t_0+2P$. It may be seen that over this period of time vehicle 405 moves a distance across warehouse 400, as seen by the progression of events from the lower part of FIG. 4A representing time $t_0$, to the middle part of FIG. 4A representing time $t_0+P$, to the top of FIG. 4A representing time $t_0+2P$.

Also shown in FIG. 4A is that vehicle 405 may be carrying an exemplary object, box, or container 410, and that exemplary container 410 may have associated with it an RFID Tag1 102a. Container 410 is resting securely on vehicle 405 and Tag1 102a is attached to container 410. In this embodiment RFID reader 104 is attached to vehicle 405 and is stationary in relation to vehicle 405.

Because Tag1 102 is affixed to container 410 and is being carried by vehicle 405, there is a fixed relative distance between antenna 202 of RFID reader 104 and Tag1 102a. That fixed distance is indicated by the line labeled D1. It can be seen through the progression of drawings that even as vehicle 405 moves through environment 400, container 410, RFID reader 104, associated antenna 202 and Tag1 102a all remain in a fixed relationship with the vehicle 405. Therefore, over time, the distance D1 remains constant as long as container 410 is being carried by vehicle 405.

The time interval between each of the three views of the vehicle 405 (and associated elements) shown in FIG. 4A is denoted as time interval P. In this exemplary embodiment, RFID reader 104 will emit a signal at a given frequency f, and that frequency f has a corresponding fundamental period $P_f$, as well as an associated wavelength λ (discussed further below). For ease of description the time interval P illustrated in FIG. 4A is some integer multiple of the fundamental period $P_f$, that is, $P=n*P_f$, where 'n' is an integer value. As will be discussed in detail below, Tag1 102a, whose distance D1 from reader 104 remains fixed, when interrogated, should always return a signal of approximately constant strength at those time intervals denoted by to, $t_0+P/2$, $t_0+P$, $t_0+3P/2$, $t_0+2P$, $t_0+5P/2$, $t_0+3P$, etc.

Also seen in exemplary environment 400 is a second Tag2 102b. Tag 2 102b is stationary within the environment 400. For example, Tag2 102b may be attached to a box or some other product or storage unit within warehouse environment 400 which is currently stationary with respect to the facility. Therefore Tag2 102b remains stationary while vehicle 405 is in motion. Therefore, there is relative motion between vehicle 405 and Tag2 102b. At time $t_0$, Tag2 102b is at a distance $D2_1$ from antenna 202. At time $t_0+P$, Tag2 102b is at a distance $D2_2$ from antenna 202. Finally, at time $t_0+2P$, Tag2 102b is at distance $D2_3$ from antenna 202.

Also seen in exemplary environment 400 is a third tag, Tag3 102c which is also in motion. However, Tag3 102c is in motion independently of vehicle 405 (for example, a person may be carrying an object to which is attached Tag3 102c). Whatever the cause of motion of Tag3 102c, the result is that while Tag3 102c is in motion, it is unlikely to be in motion that is synchronous or coherent with vehicle 405. Consequently, Tag3 102c is not in coherent motion with RFID reader 104; this can be seen from the varied distances between Tag3 102c and antenna 202 of RFID reader 104.

For example, at time $t_0$, Tag3 is at a distance D3, from antenna 202 of RFID reader 104. At time $t_0+P$, Tag3 102c is at a distance $D3_2$ from antenna 202. Finally, at time $t_0+2P$, Tag3 102c is at a distance $D3_3$ from antenna 202.

Figure 4B:
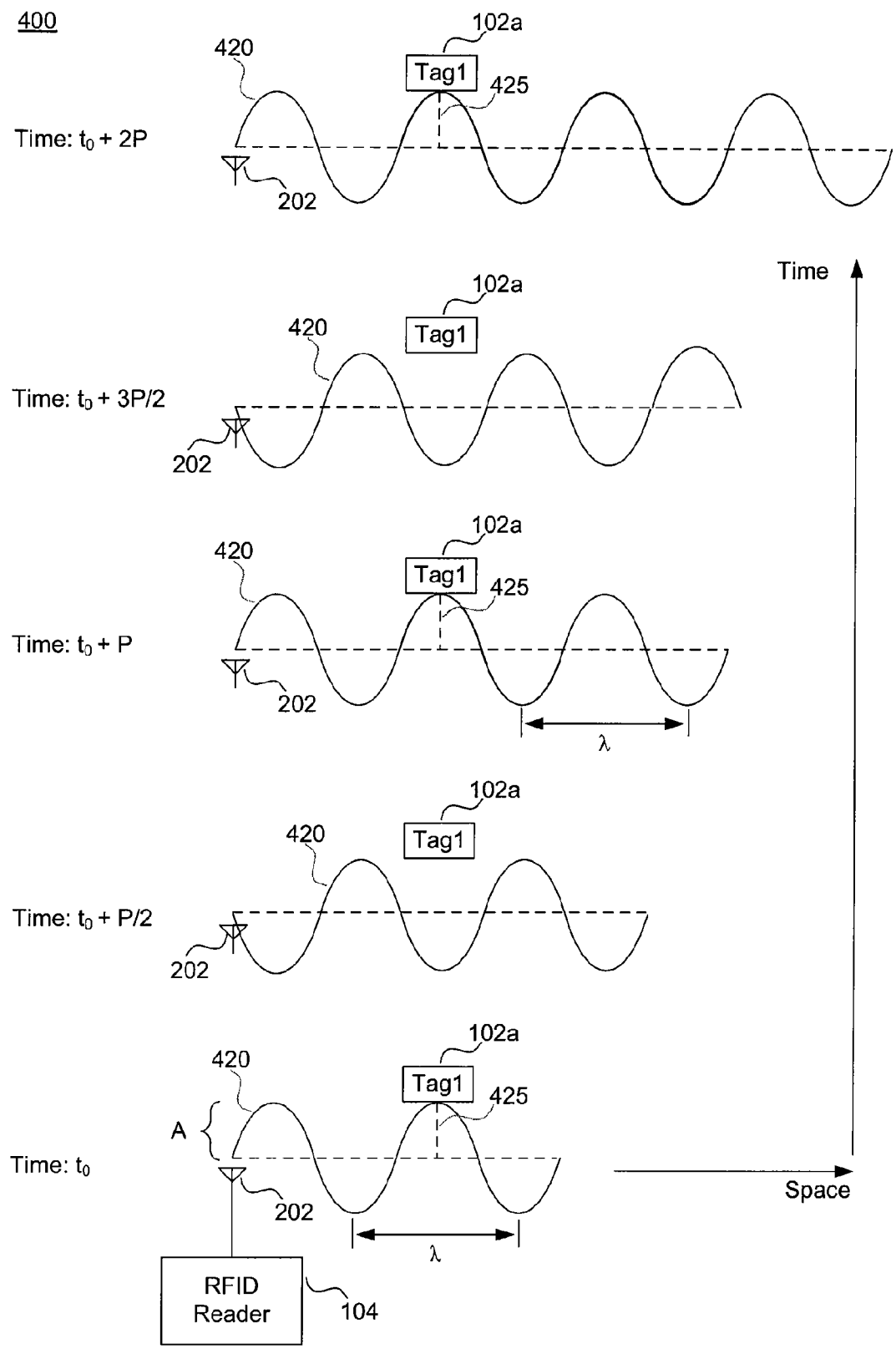
FIG. 4B is another view of the exemplary environment of FIG. 4A, including a time series of illustrations showing the relationship between the first RFID tag in synchronous motion with the RFID reader, and a radio frequency wave emanating from an antenna of the RFID reader.

FIG. 4B examines the circumstances shown in FIG. 4a from another point of view. FIG. 4B shows an exemplary RF signal 420 having a wavelength λ that emanates from antenna 202 of RFID reader 104, which is associated with exemplary vehicle 405. For purposes of illustration in FIG. 4B, Tag1 102a is placed at a particular distance from antenna 202. Tag1 102a is shown to be a distance of one and a half wavelengths (that is, 1.5*λ) from antenna 202. It will be understood by persons skilled in the relevant arts that this distance of one and a half wavelengths is purely for convenience in the illustration.

Exemplary RF signal 420 has a maximum amplitude A. Tag1 102a is at a fixed distance from antenna 202, and thus is positioned at a particular phase of that RF signal 420. In the example shown, at time t0, Tag1 102a happens to be positioned at a point where it is receiving a maximum amplitude 425 from RF signal 420. Shown also in FIG. 4B is the transit of RF signal 420 at a series of time slices, specifically times $t_0+P/2$, $t_0+P$, $t_0+3P/2$, and $t_0+2P$.

At time $t_0+P/2$, RF wave 420 is exactly 180° out of phase with its position at time $t_0$. As a consequence, Tag1 102a still sees a maximum amplitude and would still at that time therefore return a maximum signal. Similarly (and noting again that Tag1 102a does not move over time in relation to antenna 202), at times $t_0+P$, $t_0+3P/2$ and $t_0+2P$, Tag1 102a will see a maximum amplitude 425 of RF signal 420; consequently, Tag1 102a will return a maximum signal at these times. This is therefore an indication that Tag1 102a is moving synchronously or coherently with RFID reader 104 and its antenna 202.

Figure 4C:
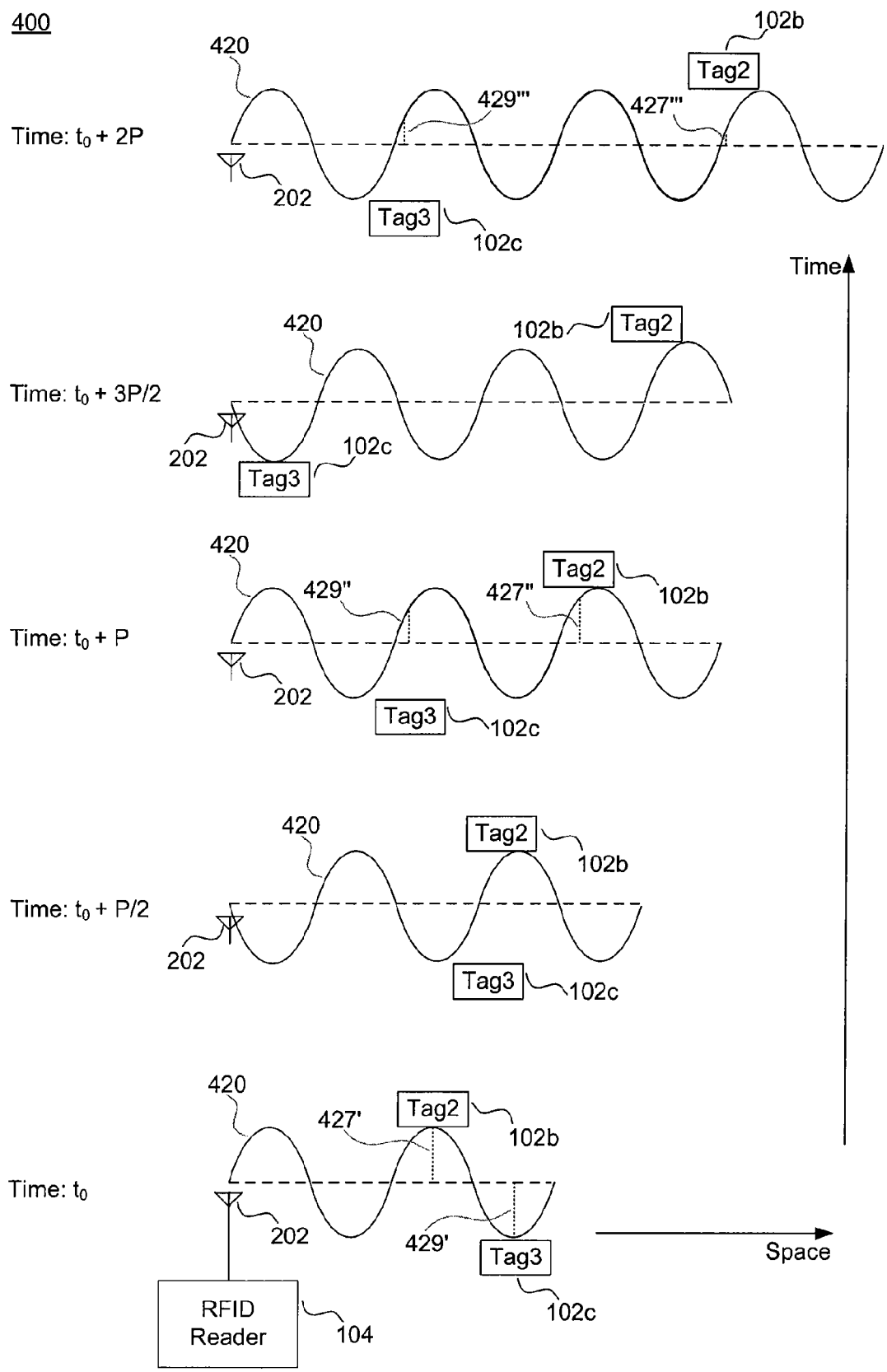
FIG. 4C is another view of the exemplary environment of FIG. 4A, including a time series of illustrations showing the relationship between the second and third RFID tags not in synchronous motion with the RFID reader, and a radio frequency wave emanating from an antenna of the RFID reader.

FIG. 4C is another view of environment 400, this time focusing on Tag2 102b and Tag3 102c. Again, Tag2 102b and Tag3 102c are shown in relation to RFID reader 104 and reader antenna 202. (Note however that for reasons of space the distances between Tag2 102b and antenna 202, or the distance between Tag3 102c and antenna 202, are not necessarily drawn in proportion to the distances as they were portrayed in FIG. 4A.)

What is consistent, however, between FIG. 4A and FIG. 4C is that both Tag2 102b and Tag3 102c are shown as being in motion over time relative to RFID reader 104 and RFID reader antenna 202. Once again, five time slices are presented: $t_0$, $t_0+P/2$, $t_0+P$, $t_0+3P/2$, and $t_0+2P$.

Because of the relative motion between RFID Reader 104 and Tag 2 102b, Tag 2 102b will not always be at the same phase of an RF wave emitted by antenna 202. In the case of Tag2 102b it can be seen that at a first time $t_0$, Tag2 102b is located in relation to antenna 202 at a position wherein it receives a maximum amplitude 427' of RF signal 420 At time $t_0+P$ Tag2 102b is seen to receive an amplitude of energy 427" which is less than 427'. At time $t_0+2P$ Tag2 102b is seen to be in a position relative to antenna 202, and in relation to RF signal 420, such that Tag2 102b receives only a very small amount of energy 427'". Because Tag2 102b is not always at the same phase of radio wave 420 it does not consistently respond to RFID Reader 104 in the same manner. It can also be seen by looking at the location of Tag2 at times t0+P/2 and t0+3P/2 that Tag2 is at locations where it will receive amounts of energy which are less than the full amplitude of RF signal 420.

Similarly, it can be seen from inspection of FIG. 4C that Tag3, as it changes position at various times, also receives at these various times varying amounts of RF energy 429', 429", 429'" from RF signal 420.

In summary, at periodic intervals such as $t_0$, $t_0+P$ or $t_0+2P$, where the periods are integer multiples of the period P of RF signal 420, Tag2 102b and Tag3 102c do not receive consistent amounts of energy from RF signal 420. Rather, as a result of their motion in relation to antenna 202, they receive inconsistent amounts of energy from RF signal 420. Similarly, observing the energies received by Tag2 102b or Tag3 102c at times $t_0+P/2$ and $t_0+3P/2$, it may again be observed that the amounts of energy received respectively by each tag at these times (that is, times which are separated by multiples of the period P of RF signal 420) are not consistent amounts of energy. This is a reflection of the fact that these tags are in non-coherent motion in relation to RFID reader 104.

This is unlike the case for Tag1 102a which was examined in detail in FIG. 4B, where at intervals of time equal to integer multiples of the period P of RF wave 420, Tag1 102a could be expected to receive a consistent amount of energy.

Figure 5A:
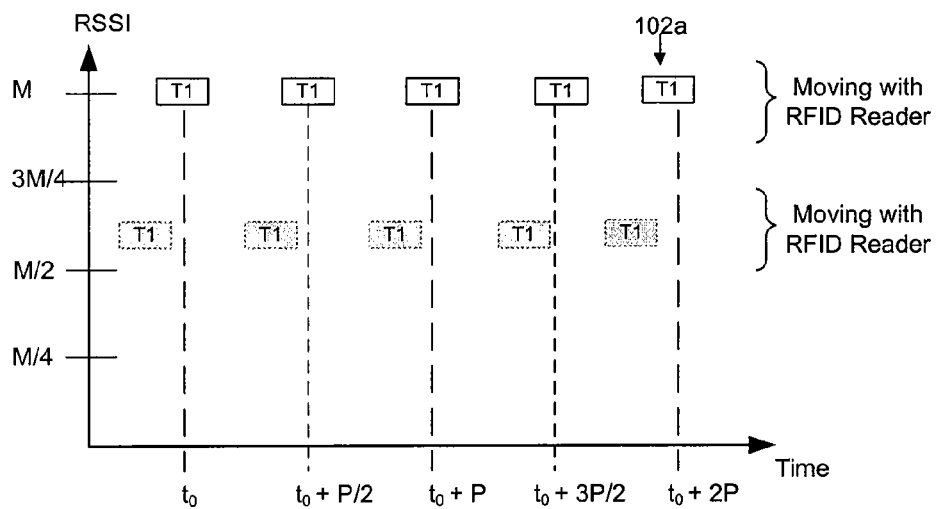
FIG. 5A is an exemplary plot of the energy returned to the exemplary RFID reader of FIG. 4A by the first RFID tag in synchronous motion with the RFID reader.
Figure 5B:
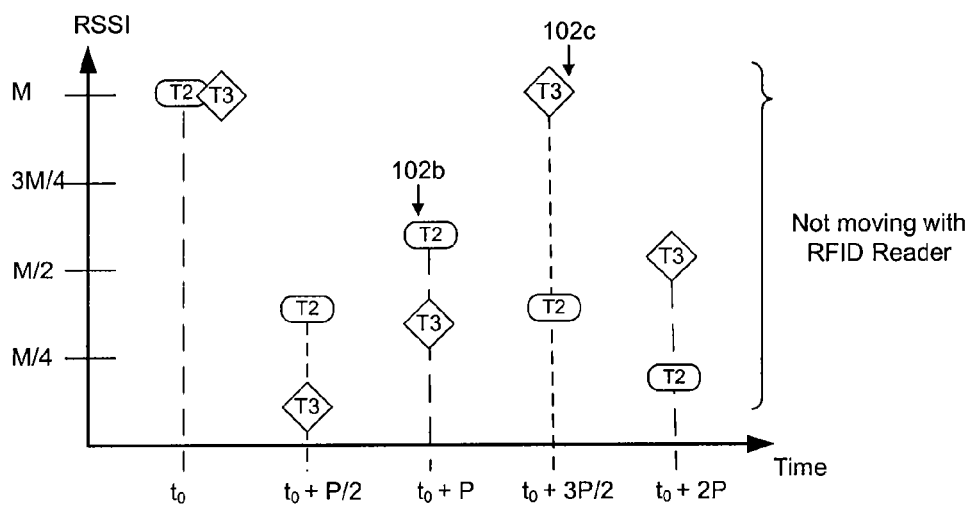
FIG. 5B is an exemplary plot of the energy returned to the exemplary RFID reader of FIG. 4A by the second and third RFID tags not in synchronous motion with the RFID reader.

FIGS. 5A and 5B provide exemplary plots 500 and 550, respectively, of the energy returned by an RFID tag 102 to RFID reader 104 in exemplary environment 400 and help to illustrate how an RFID tag moving coherently with a reader can be easily identified.

Exemplary plot 500 shows the RSSI values, or received energy values, from Tag1 102a at various times shown in FIG. 4. In plot 500 it is shown that at successive time intervals which are synchronous with the half period of the RF signal 420, and starting with time $t_0$, Tag1 102a (labeled also as "T1" in plot 500) will consistently return an amount of energy which is at a maximum amplitude, here indicated by the letter M. This is an indication that Tag1 102a is moving coherently with RFID reader 104. As explained above in conjunction with FIG. 4B, if at a time $t_0$, Tag1 102a is located at a peak of RF signal 420, then at time intervals of P/2, P, 3P/2, 2P, etc., RF signal 420 will again present its peak amplitude to Tag1 102a; therefore Tag1 102a will return a maximum energy.

As is also shown in plot 500, at other times Tag1 102a may receive less energy and therefore return less energy, as indicated by a lower RSSI value for the dotted, shaded markers for Tag1 102a. However, as long as measurements are made at intervals which reflect the half period P/2 of RF signal 420 emitted by RFID reader 104, those measurements of the received energy reading of Tag1 102a should have substantially consistent value.

FIG. 5B presents exemplary plot 550 showing the RSSI values or received energy values, from Tags2 102b and Tags3 102c of exemplary environment 400 as a function of the time. Again, the time intervals shown are half intervals of the period P of RF signal 420, at successive times $t_0$, $t_0+P/2$, $t_0+P$, $t_0+3P/2$, and $t_0+2P$. As can be clearly seen from the plot, there is no particular correlation or consistency between the energies actually received from Tag2 102b at these periodic time intervals; a similar lack of correlation or consistency is observed for the readings of Tag3 102c. This lack of consistency is a direct result of the fact that neither Tag2, 102b nor Tag3 102c, are consistently at the same phase of RF signal 420. This lack of consistency may be taken as an indicator that both Tag2 102b and Tag3 102c are not moving coherently with RFID reader 104.

Figure 6:
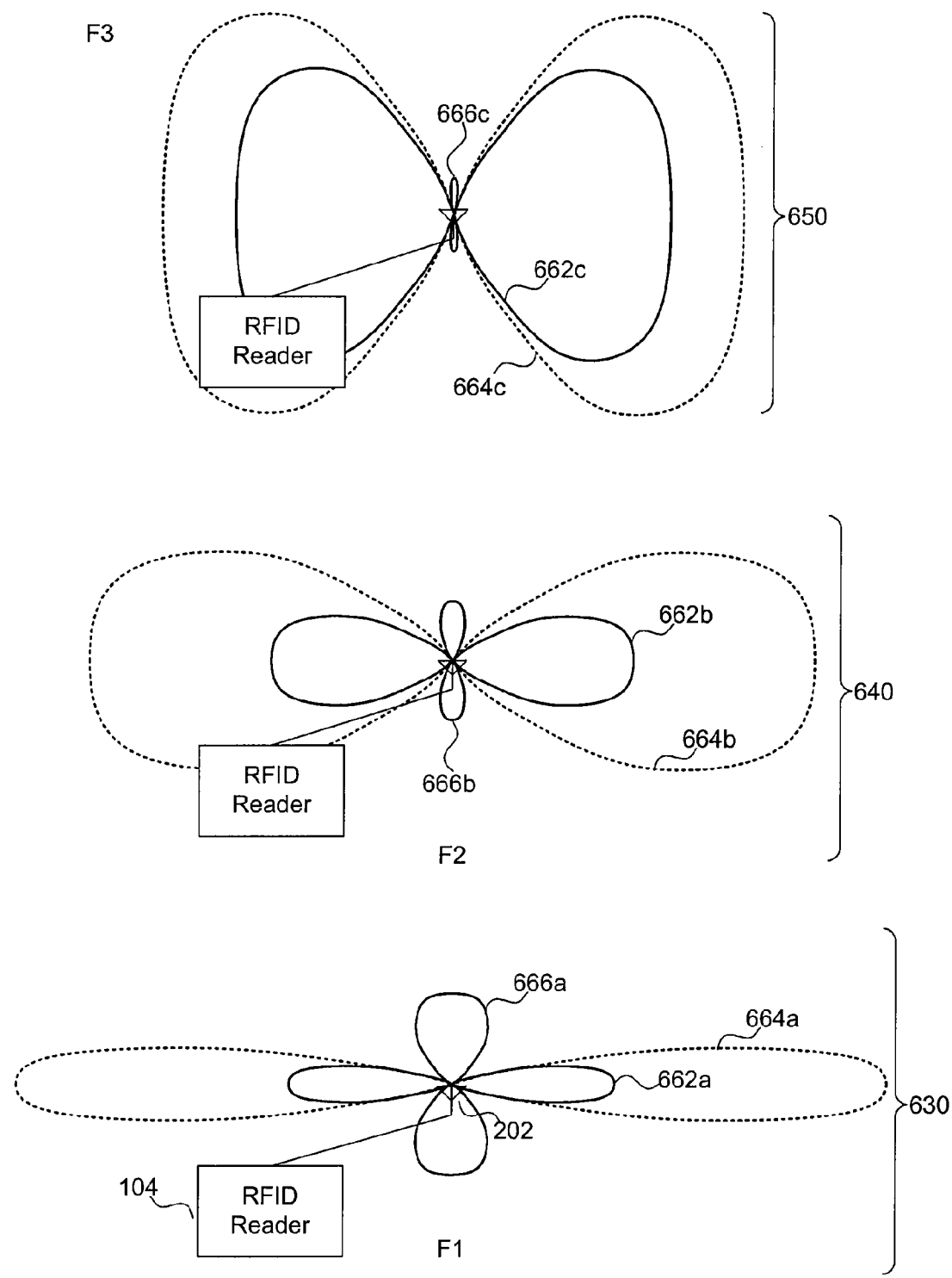
FIG. 6 illustrates exemplary patterns of RF signal radiation from an exemplary RFID reader at different RF frequencies.

4. Second Exemplary Method to Identify an RFID Tag Moving Coherently with Reader Certain RFID tag arrangements utilize a frequency hopping scheme wherein the reader interrogation signal includes discrete bursts of signal at different frequencies with in a band of frequencies. The discrete bursts can be transmitted according to a pattern or randomly. For example, UHF RFID readers in the United States are said to operate at 915 MHz, but may actually operate in a range from 902 MHz to 928 MHz inclusive. They may frequency hop randomly, or in some predetermined sequence or pseudo random sequence, to frequencies from 902 MHz to 928 MHz inclusive. FIG. 6 schematically represents an RFID reader 104 operating at three distinct frequencies: F1, F2, and F3.

Also shown schematically are representations of the antenna radiation patterns associated with the different frequencies. As is well known in the art, different frequencies can result in changes in the radiative pattern from an antenna, which is illustrated in FIG. 6. Three different exemplary radiative patterns are illustrated, exemplary radiative pattern 630 associated with frequency F1, exemplary radiative pattern 640 associated with frequency F2, and exemplary radiative pattern 650 associated with frequency F3.

For each of the three exemplary radiative frequency patterns 630, 640 and 650, two lobes of the radiation pattern are depicted. A primary lobe is depicted by two overlapping radiative areas 662 and 664, where area 662 is a region of stronger radiative output and area 664 is a region of weaker radiative output. Also, shown is side lobe 666 which may have a different level of radiative strength than area 662 or 664. However, for convenience in the discussion which follows, it may be assumed that side lobe 666 has a radiative power or strength which is the same as the power within radiative area 662.

Persons skilled in the relevant arts will recognize that actual patterns of radiative power dispersal from antenna 202 may vary significantly from that shown, and will in general depend on the precise design of antenna 202 and other factors. Similarly, persons skilled in the relevant arts will recognize that the degree of variation between antenna patterns 630, 640, and 650 may have been exaggerated for illustrative purposes. Further, persons skilled in the relevant arts will recognize that the strength of the RF signal may vary continuously in space, rather than being segmented into regions of distinct strength with specific boundaries.

However, persons skilled in the relevant arts will recognize that a pattern of energy dispersal with varying strength in space does exist for an RF signal emitted from an antenna, and further that the pattern does typically vary with frequency in a manner suggested by exemplary radiative patterns 630, 640, and 650, with regions of stronger radiation, weaker radiation, and null zones.

Figure 7:
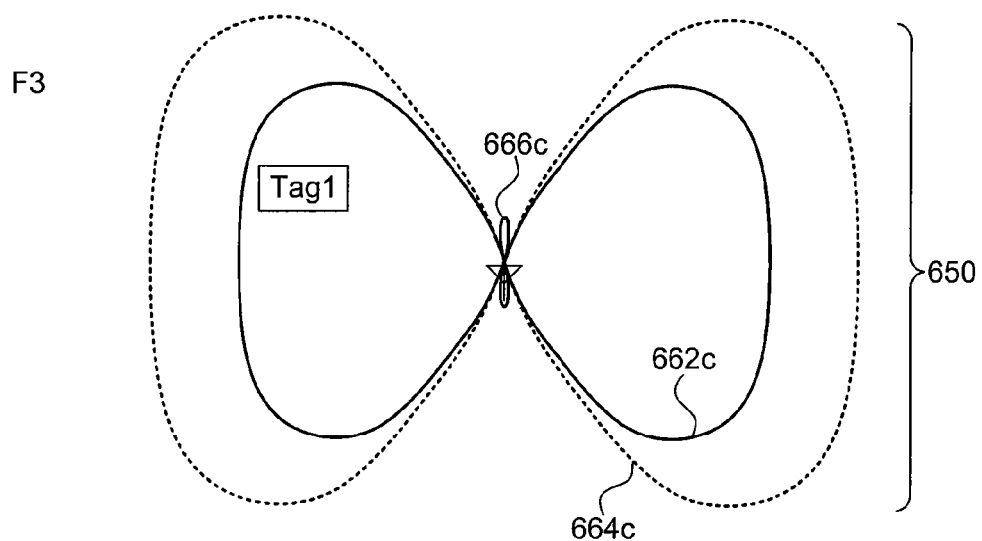
FIG. 7 illustrates exemplary interactions between an exemplary RFID reader and an exemplary RFID tag at various exemplary frequencies that may be used by the exemplary RFID reader, where the RFID tag is stationary relative to the reader.
Figure 7:
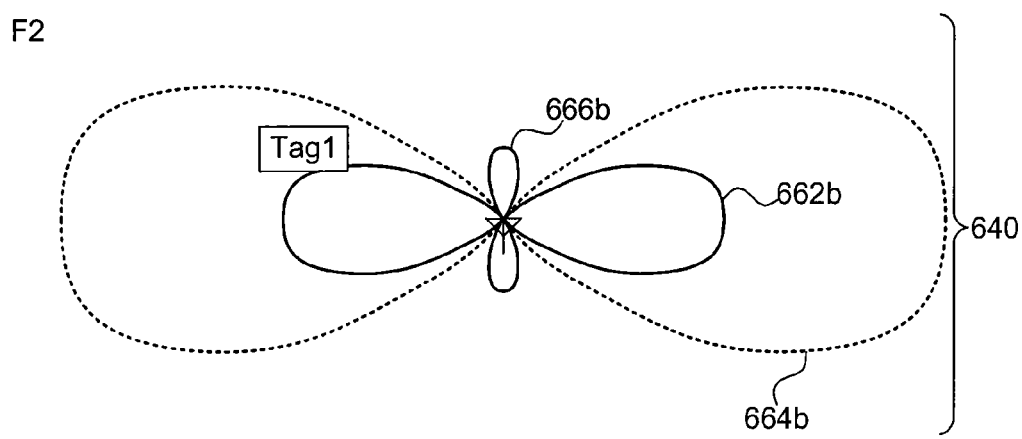
Figure 7:
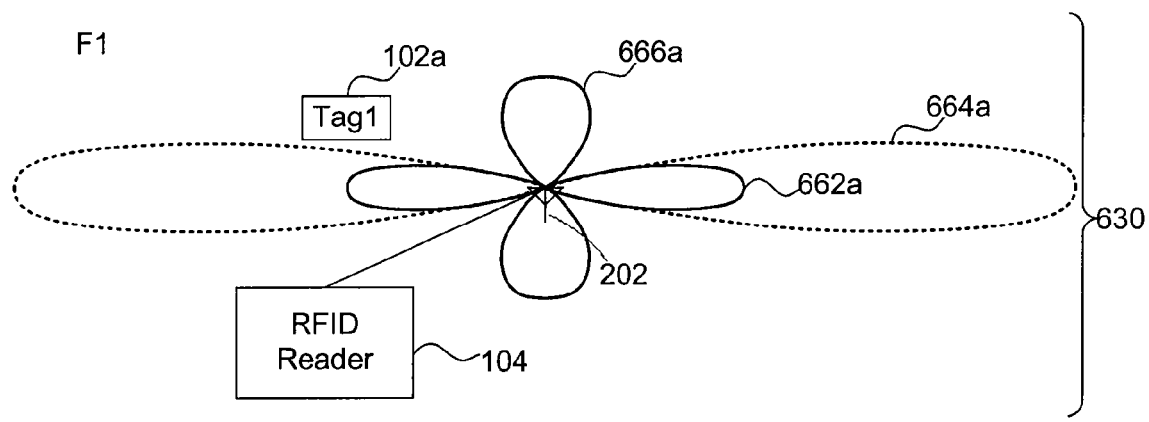

FIG. 7 again depicts RFID reader 104 coupled to antenna 202. FIG. 7 also depicts an RFID tag labeled as Tag1 102a. RFID reader 104 may be stationary or may be in motion. Tag1 102a is stationary relative to RFID reader 104, and in particular relative to RFID reader antenna 202. Therefore, if RFID reader 104 is in motion, then Tag1 102a is also in motion synchronously, or coherently, with RFID reader 104, such that Tag1 102a maintains the same relative position over time in relation to antenna 202.

FIG. 7 illustrates the interaction between RFID reader 104 with antenna 202, and Tag1 102a, at the various frequencies that may be used by RFID reader 104.

For example, when RFID reader 104 is operating at frequency F1, and therefore antenna 202 is displaying radiative pattern 630, Tag1 102a may fall in a null region of radiative pattern 630. As a consequence Tag1 102a does not receive any energy from RFID reader 104. Therefore, as a further consequence, Tag1 102a does not send a signal back to RFID reader 104; hence, during the period when RFID reader 104 is operating at frequency F1, Tag1 102a is not detected.

When RFID reader 104 is operating at frequency F2, antenna 202 exhibits radiative pattern 640. With Tag1 102a remaining in the same position relative to antenna 202 (as a result of moving synchronously or coherently in relation to antenna 202 of reader 104, if antenna 202 is in motion), Tag1 102a falls within outer lobe 664 and therefore Tag1 102a receives a relatively weak signal from RFID reader 104. Therefore Tag1 102a will be detected by RFID reader 104 at a relatively low received signal strength indicator ("RSSI").

When RFID reader 104 is operating at frequency F3, antenna 202 exhibits radiative pattern 650. With Tag1 102a still in the same relative position in relation to antenna 202 (as a result of moving synchronously or coherently in relation to antenna 202 of reader 104, if antenna 202 is in motion), Tag1 is now within the zone of the large near primary lobe 662 of radiative pattern 650. As a consequence Tag1 102a now receives a larger amount of energy from RFID reader 104, and therefore Tag1 102a returns a larger RSSI to RFID reader 104.

It will be noted from FIG. 7 that as long as Tag1 102a maintains the same relative position in relation to RFID reader antenna 202, that any time RFID reader 104 operates at one of the established frequencies—for example, frequency F1, frequency F2, or frequency F3—Tag1 102a will always fall within a same, respective region of the antenna pattern 630, 640, 650 corresponding respectively to the emitted frequency. Therefore, Tag1 102a will always return to RFID reader 104 a specific RSSI which will be correlated with a given frequency. For example, frequency F1 will have associated with it an RSSI of 0, frequency F2 will always have associated with it a relatively low RRSI value, and frequency F3 will always have associated with it a relatively high RRSI value.

Persons skilled in the relevant arts will recognize that in fact, due to multipath reflections and other environmental factors, the dispersal of radiation by antenna 202 may not always be precisely uniform for a given frequency. As a consequence, in real world operations the RSSI detected by RFID reader 104 may vary for a given frequency even if Tag1 102a retains the same fixed relative position in relation to antenna 202. However, such variations may be minimal; in addition, over a long term period of time, the RSSI values returned by Tag1 may tend to cluster around a given value which may be associated with any given frequency of operation of RFID reader 104.

Figure 8:
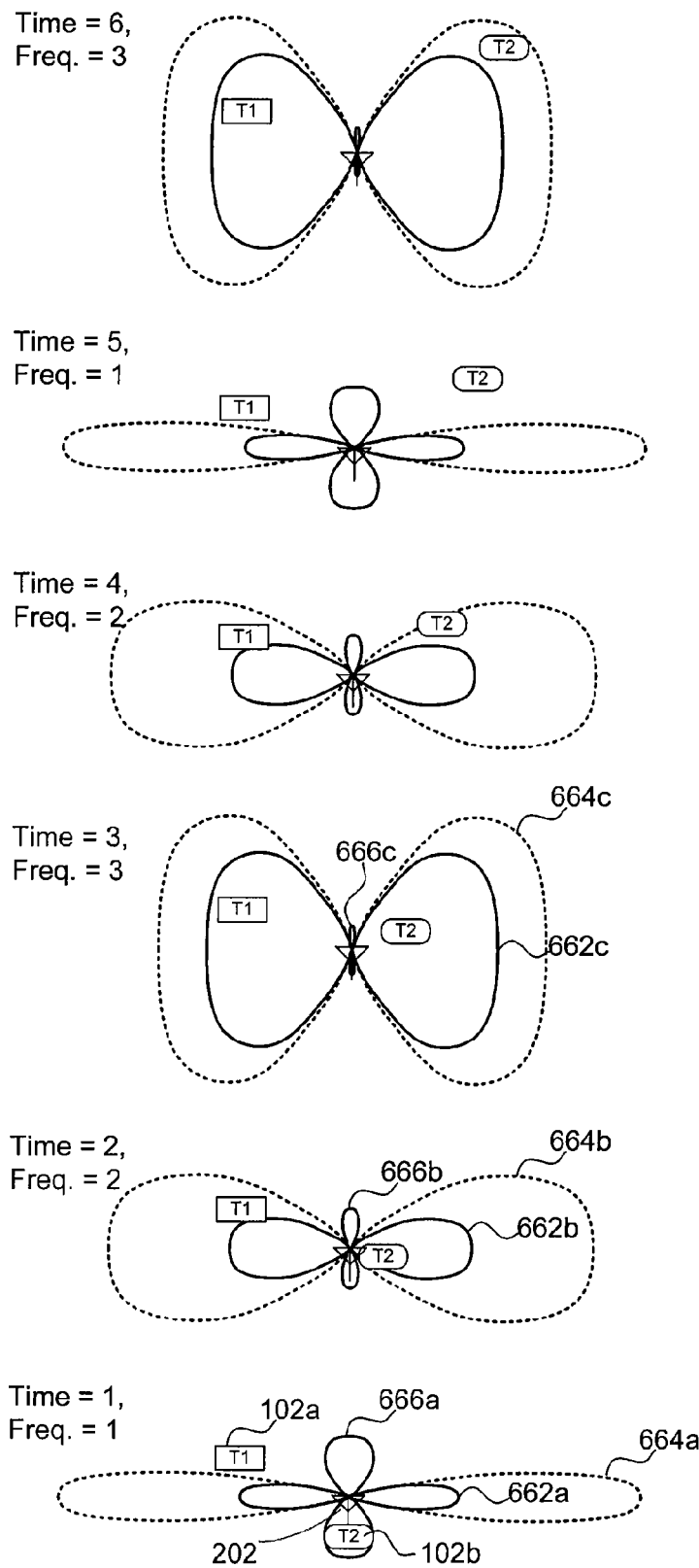
FIG. 8 is a time series of images of two exemplary RFID tags, one stationary relative to an exemplary RFID reader and one in motion relative to the exemplary RFID reader.

FIG. 8 is a time series of images over six time intervals. RFID reader 104 is not shown in the figure, but is implied as being linked to RFID reader antenna 202 which is shown. The time series of six time periods shows three different frequencies being used, with each frequency being repeated twice during the time series, along with the associated radiative patterns already discussed above in conjunction with FIG. 6 and FIG. 7. RFID Tag1 102a is also illustrated (now labeled "T1" for reasons of space on the drawing), as previously shown in FIG. 7, in a fixed relative position in relation to RFID reader antenna 202. As a consequence, and as already discussed in conjunction with FIG. 7, RFID Tag1 102a will show a substantially constant correlation between the detected RSSI of Tag1 102a, as detected by reader 104, and the frequency which is being emitted by antenna 202 of reader 104.

An additional element in FIG. 8 is a second RFID Tag2 102b (labeled as "T2"). Unlike Tag1 102a, which is stationary relative to antenna 202 (or, equivalently is moving synchronously or coherently with antenna 202), RFID Tag2 102b is in motion relative to antenna 202. As a result, Tag2 102b does not maintain a predictable location in the antenna field pattern over time.

For example, at time 1, RFID Tag2 102b is located within side lobe 666 of the antenna pattern, which for purpose of discussion may be assumed to have a strength approximately the same as inner primary lobe 662 of the radiation pattern 630.

At time 2, Tag2 102b has moved relative to antenna 202 such that Tag2 102b is now within the domain of inner primary lobe 662.

At time 3 Tag2 102b is still within the domain of inner primary lobe 662. Therefore, at times 1, 2 and 3, Tag2 102b will be detected with a strong RSSI value. However, at these three times (namely time 1, time 2 and time 3), antenna 202 is radiating at three different frequencies, namely frequency F1, frequency F2 and frequency F3. Therefore a particular RSSI value for Tag2 102b is not correlated with any particular frequency used by RFID reader 104.

This lack of correlation continues through times 4, 5 and 6. For example, at time 4, which is associated with frequency F2, Tag2 102b may be found in the region of outer primary lobe 664 and therefore may be expected to return a low RSSI which is associated with frequency F2.

At time 5, Tag2 102b is in a null region and therefore will return no energy at all to RFID reader 104.

At time 6 associated with frequency F3, Tag2 102b is again in outer primary lobe 664, and therefore will return a low RSSI value to RFID reader 104.

Figure 9:
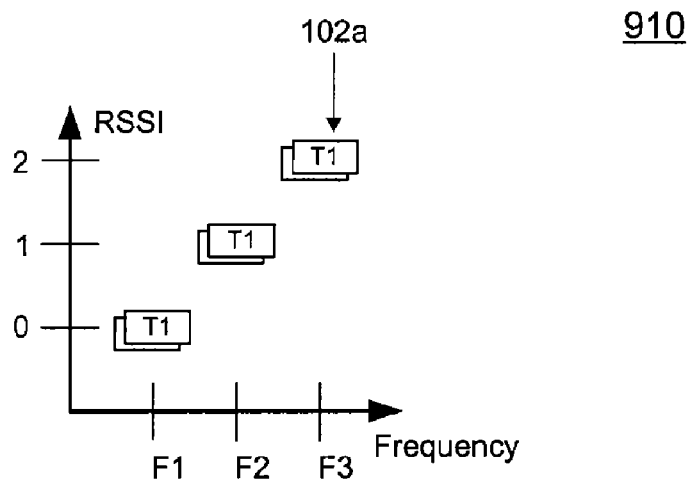
FIG. 9 shows two plots which reflect exemplary correlations or lack of correlations between received signal strength from an exemplary RFID tag and the frequency of a read from an exemplary RFID reader, based on the exemplary tags and exemplary reader of FIG. 8.
Figure 9:
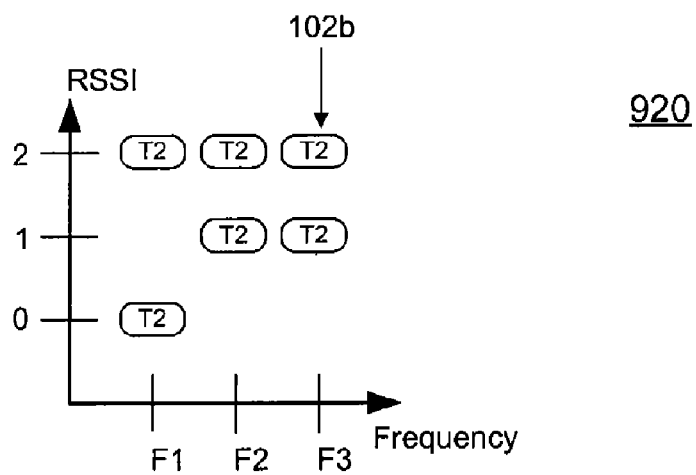

FIG. 9 shows two plots 910, 920 which are directly associated with the exemplary tag behavior illustrated in FIG. 8, discussed immediately above.

Plot 910 shows the relationship between:
the received signal strength value, or RSSI, detected by RFID reader 104 from Tag1 102a; and
the corresponding frequency of operation of RFID reader 104.

In particular, in plot 910 the RSSI values received from Tag1 102a are plotted in relation to the frequency at which RFID reader 104 was operating at the time the RSSI values were detected. As can be seen on the plot, at both times when the RSSI value from Tag1 102a was 0 (meaning Tag1 102a was not detected at all), RFID reader 104 was operating at frequency F1. As can also be seen in plot 910, on the two occasions when a low RRSI value was detected from Tag1 102a (represented as an RSSI value of 1), RFID reader 104 was operating at frequency F2. Finally, both times when a high RSSI value (indicated as RSSI value 2) was detected from Tag1 102a, RFID reader 104 was operating at frequency F3.

Therefore, it can be clearly seen from plot 910 that the 0 RSSI value for Tag1 102a is correlated with frequency F1; the low RSSI value for Tag1 102a is correlated with frequency F2; and the high RSSI value for Tag1 102a is correlated with frequency F3. This correlation between the RSSI values for Tag1 102a and the frequency at which RFID reader 104 is operating is taken to be an indicator that Tag1 102a is moving coherently with antenna 202 of RFID reader 104.

Plot 920 shows the relationship between the detected RSSI values of Tag2 102b as a function of the frequencies at which RFID reader 104 was operating at the time of detection of Tag2 102b. As can be seen from the plot, at frequency F1 Tag2 102b was detected with a high RSSI value of 2 on one occasion, but not detected at all on another occasion. At frequency F2, Tag2 102b was detected at both a low RSSI value and a high RSSI value. Similarly, at frequency F3, Tag2 102b was detected at both a low RSSI value and a high RSSI value. There is a clear lack of correlation between the detected RSSI values from Tag2 and the frequencies. This lack of correlation is interpreted as the reader and the tag not moving synchronously, which is consistent with the exemplary tag behavior exhibited in FIG. 8 above.

5. Third Exemplary Method to Identify an RFID Tag Moving Coherently with Reader

The method just described with respect to FIGS. 4 through 7 above, for determining if an RFID tag 102 is moving synchronously or not moving synchronously with respect to an RFID reader 104, may be applicable over relatively short distances, for example, distances on the order of several meters, as well as possibly for longer distances.

When an RFID reader may be moving over even larger distances, for example, across the span of a warehouse or other facility, an additional method may be available to supplement the method described above, and/or as an alternative to the method described above. The method entails analyzing the visibility of an RFID tag 102 to reader 104 over a period of time. In general, the following criteria contribute to a positive determination that an RFID tag 102 is moving coherently with reader 104 over a period of time:

RFID tag 102 is visible to reader 104 during all, substantially all, or at least a majority of reads over the period of time;

the reads for which RFID tag 102 is visible to reader 104 over the period of time are distributed uniformly or substantially uniformly over the period of time;

the reads for which RFID tag 102 is visible to reader 104 over the period of time span the full period of time under consideration;

the reads for which RFID tag 102 are visible to RFID reader 104 over the period of time are consecutive reads, or are consecutive except for gaps attributed to RFID tag 102 being in a null zone of RFID reader 104 at some specific frequency or frequencies.

Figure 10:
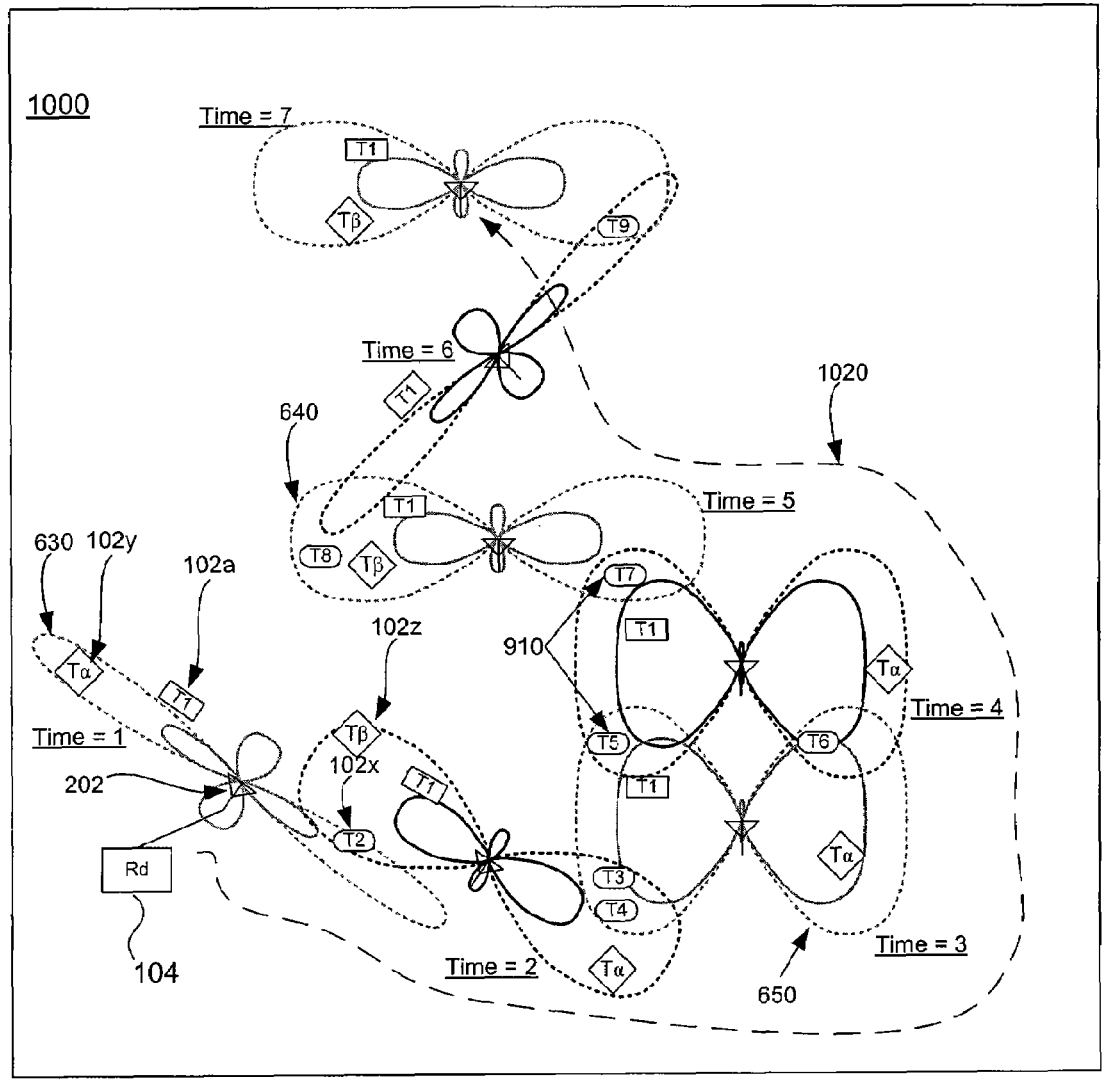
FIG. 10 shows an exemplary environment where an exemplary RFID reader is being moved over some distance, and various exemplary RFID tags are present.

FIG. 10 illustrates an exemplary environment 1000 which may, for example, be a warehouse or other facility where an RFID reader 104 is being moved over some distance. For example, in a warehouse facility, a forklift or other conveyance may be used to pick up items stored in the warehouse, the forklift may have an onboard RFID reader 104, while items picked up may have onboard RFID tags 102.

Dotted line 1020 in FIG. 10 shows an exemplary approximate path 1020 which may be traveled by a hypothetical conveyance in a warehouse facility. RFID reader antenna 202 is shown in the figure at a succession of times, specifically time equals 1 through time equals 7. (In FIG. 10, the forklift or other conveyance is not shown. RFID reader 104, which is attached to antenna 202, is only shown at one point on the diagram, for Time 1, and is left implied elsewhere, i.e., at other times, to avoid visual clutter. Also, note that in FIG. 10, the antenna patterns are alternately either solid black or shaded gray; this too is for ease of viewing only, to help visually distinguish time-adjacent but overlapping antenna patterns, and has no other significance.)

Also, shown in the diagram is RFID Tag1 102a; a collection of other RFID tags 102x which are labeled T2, T3, T4, T5, T6, T7, T8 and T9 102x; and two additional tags, Tα 102y and Tβ 102z.

Tags T2-T9 102x are understood to be stationary in the warehouse facility, while Tag1 102a is understood to be carried on the same conveyance (such as a forklift) which carries RFID reader 104 and RFID reader antenna 202. Tags Tα 102y and Tβ 102z are understood to be in motion over the period of time, but independently of the motion of RFID reader 104 (for example, they are not carried on the same forklift as RFID reader 104).

At progressive times Time=1 through Time=7, it can be seen in FIG. 10 that Tag1 102a maintains the same relative position in relation to RFID reader antenna 202; therefore Tag1 102a will be visible to RFID reader 104 at many or substantially all of the observation times from Time=1 through Time=7.

It can be equally seen from FIG. 10 that T2 through T9 102x will only sometimes fall within the radiative antenna pattern 630, 640, 650 of RFID reader 104 and associated antenna 202. Specifically, since tags T2 through T9 102x are stationary, they will only be seen by RFID reader 104 when reader 104, in the course of its travels, happens to come within range of tags T2 through T9 102x. Therefore, each tag of tags T2 through T9 102x will only be visible to reader 104 for a limited subset of times 1 through 7.

Tags Tα 102y and Tβ 102z are shown as being in motion in FIG. 10, but their motion is independent of the motion 1020 of RFID reader 104. Therefore, they may coincidentally come within range of RFID reader 104, but they are unlikely to provide the consistent readings that are provided by tag T1 102a which is in coherent motion with RFID reader 104.

Figure 11:
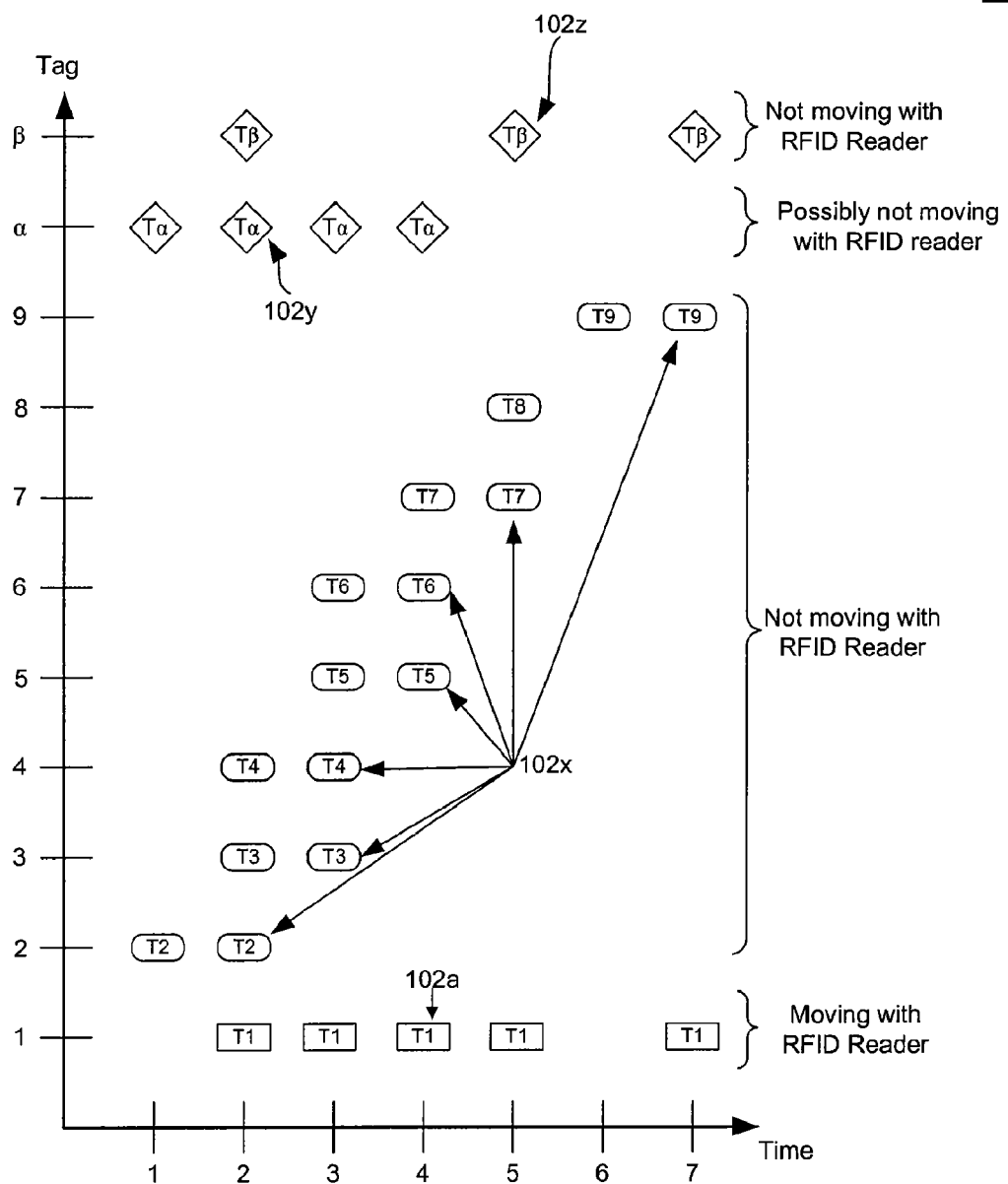
FIG. 11 is a plot of the visibility over time of the exemplary RFID tags of FIG. 10.

The visibility of the tags 102a, 102x, 102y, and 102z, as seen by RFID reader 104 in motion, is reflected in plot 1100 of FIG. 11, which is based on the exemplary scenario presented in FIG. 10. In plot 1100 it can be seen that Tag1 102a is visible to RFID reader 104 at times 2, 3, 4, 5 and 7, which substantially spans the entire time frame that the conveyance is moving along path 102x. Moreover, the distribution of reads during which Tag1 102a is visible is distributed substantially uniformly over the period of time. Therefore, it is likely that tag T1 102a is moving along with the conveyance and the associated RFID reader 104.

It can be seen on plot 1100 that remaining tags T2 through T9 102x are only visible for a short subset of times 1 through time 7. For example, T2 is visible only at times 1 and 2, while T9 is only visible at times 6 and 7. Therefore, according to the present method, it is inferred that tags T2 through T9 102x are not moving with the RFID reader.

Tag Tα 102y is read by RFID reader 104 at consecutive times 1, 2, 3, and 4. This may suggest that Tα 102y is in coherent motion with RFID reader 104a; however, since RFID tag Tα 102y is only visible for approximately half of the reads, this may suggest that Tα 102y is not moving coherently with RFID reader 104.

Persons skilled in the relevant arts will recognize that detailed coherency algorithms may be implemented which may weight various factors, such as the percentage of time tag 102 is visible, the uniformity of distribution of reads of tag 102, and the degree to which the reads of tag 102 are consecutive. Further, algorithms may be implemented which take into account known operating parameters of particular environments. For example, in the case of exemplary environment 1000 of FIG. 10, it may be known (due to the specific nature of operations in the facility), that once a forklift picks up an item, the item will remain on the forklift until the forklift has ceased motion. In that case, an RFID tag such as exemplary tag Tα 102y, which is seen for only the first half of the reads (i.e., at times 1 through 4), may be determined to not be moving with the RFID reader 104 associated with the forklift.

Finally, tag Tβ 102z is seen by RFID reader 104 at times 2, 5, and 7. These readings approximately span the full time span under consideration, and moreover are distributed approximately uniformly. However, because they represent less than half of the readings, and further because of the significant gaps between reads, an algorithm which analyzes tag Tβ 102z may conclude that the tag is not moving coherently with RFID reader 104.

As noted above, the method of analyzing the appearances of an RFID tag over a period of time may be used in conjunction with the method of correlating the strength of RFID tag readings with RFID reader frequencies; the combination of both methods is likely to provide a more reliable indicator of whether or not an RFID tag 102 is moving synchronously with an RFID reader 104.

Figure 12:
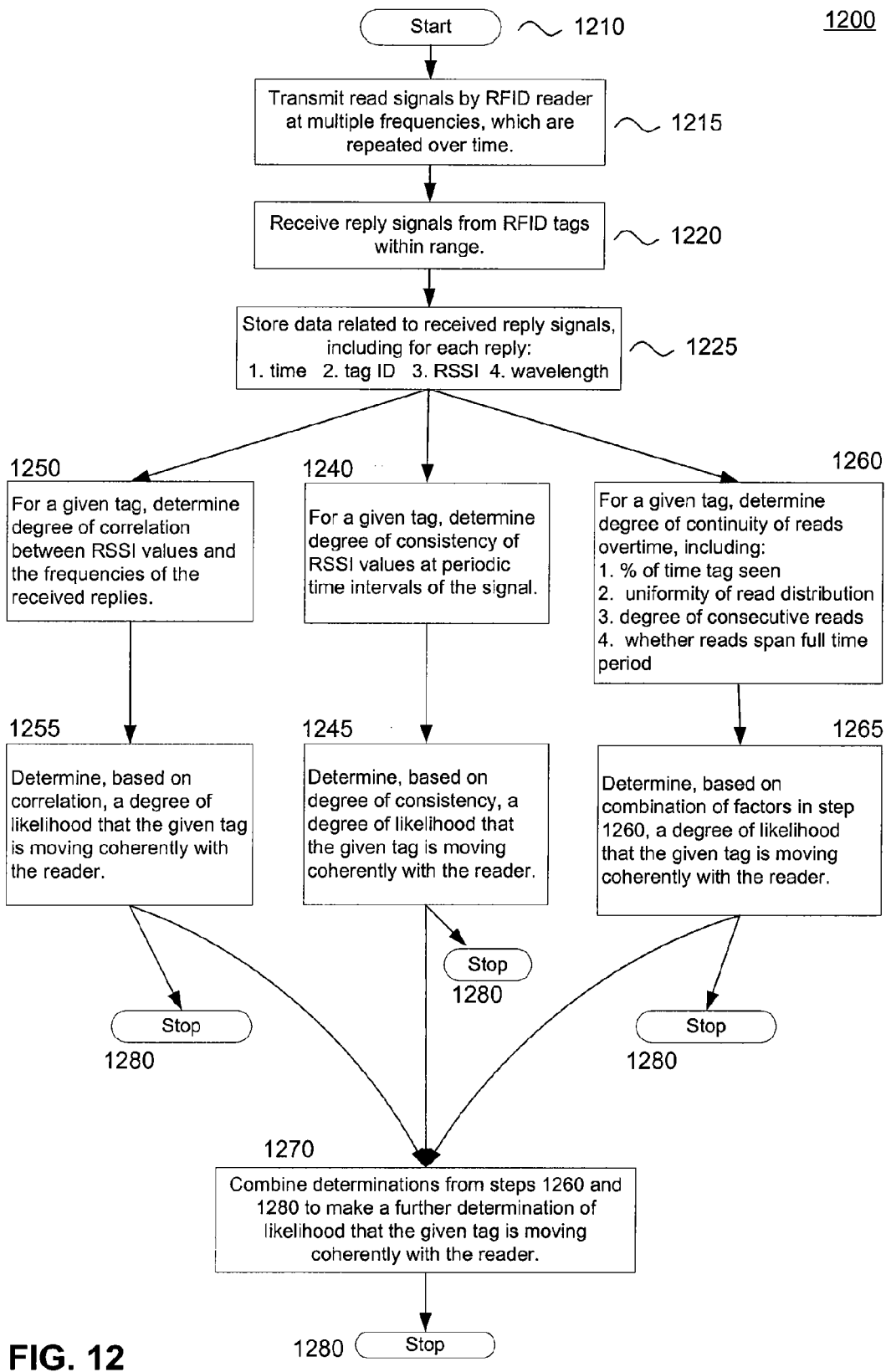
FIG. 12 is a flowchart of method to determine whether an RFID tag is moving coherently with an RFID reader.

6. Fourth Exemplary Method to Identify an RFID Tag Moving Coherently with Reader FIG. 12 is a flow chart 1200 of a method to identify an RFID tag 102 moving coherently with a reader 104. The method combines elements of the methods already discussed above.

The method begins with initialization at step 1210.

At step 1215, an RFID reader 104 begins transmitting read signals at a frequency or a variety of frequencies within a band, where if multiple frequencies are used then the frequencies are repeated over time in a designated order, or a random or pseudorandom fashion.

In step 1220, the RFID reader 104 receives signals back from any RFID tags 102 within range. In step 1225, RFID reader 104, or a processor, computer, or server associated with the reader 104, stores pertinent data. The pertinent data includes the IDs of RFID tag 102s which send back signals, the times the signals are received for each tag 102, and an indication of the signal strength (such as the RSSI) of each received signal at each time for each tag 102. The pertinent data may also include the wavelength or frequency of the signal.

The method can then branch in three directions, any of which may be performed independently, or which made be done first one then another (and in any order), or some combination of which may be performed in parallel.

A first branch continues with step 1240 where, for a given tag 102, and for a given signal frequency or wavelength, and over a period of time, a calculation is made to determine a degree of consistency of the received signal strength for the tag 102 at time intervals equal to the period of the signal.

The first branch continues with step 1245 where, based on the degree of consistency determined in step 1240, a determination is made as to the likelihood that a given RFID tag 102 is moving coherently with the RFID reader 104.

The first branch then either stops at step 1280, or continues with step 1270, discussed further below.

A second branch continues with step 1250 where, for a given tag 102, and over a period of time, a calculation is made to determine a degree of correlation between the received signal strength for the tag 102, and the frequencies at which the signal strengths were received.

The second branch continues with step 1255 where, based on the degree of correlation determined in step 1250, a determination is made as to the likelihood that a given RFID tag 102 is moving coherently with the RFID reader 104.

The second branch then either stops at step 1280, or continues with step 1270, discussed further below.

Continuing from step 1225, the third branch continues with step 1260. In step 1260, the received data is analyzed to determine, for a given tag 102 and over a period of time, a plurality of factors, which may include: (1) the percentage of time the tag 102 was seen over the period of time; (2) the uniformity of the distribution of reads for the tag 102 over the period of time; (3) the degree that reads were consecutive over the period of time; and (4) the degree to which the reads span the full period of time.

The third branch continues with step 1265 where, based on the factors analyzed in step 1260, a determination is made as to the likelihood that a given RFID tag 102 is moving coherently with the RFID reader 104.

The third branch then either stops at step 1280, or continues with step 1270. In step 1270, the determinations made in steps 1045, 1255, and 1265 are combined to give a determination which may be more complete as to the likelihood that a given tag 102 is moving coherently with the reader 104. The method then stops at step 1280.

The above description provides one embodiment of the method. Alternative embodiments are possible within the scope and spirit of the present invention. In particular, in the embodiment described immediately above, steps 1240 and 1245 are described as one data processing path, steps 1250 and 1255 are described as another data processing path, and steps 1260 and 1265 are described as yet another alternative and/or parallel data processing path. In an alternative embodiment of a method to determine whether an RFID tag 102 is moving coherently with an RFID reader 104, calculations may be performed which combine in one path or one calculation process elements of steps 1240, 1245, 1250, 1255, 1260, and 1265, to arrive at the desired determination.

7. CONCLUSION

The above examples of a system and method for determining if an RFID tag is moving with an RFID reader are exemplary only. Persons skilled in the relevant arts will recognize that a variety of threshold parameters may be set in establishing such a method and a variety of algorithms used to determine degrees of correlation between detection of RFID tags and associated parameters, such as time or frequency. Such variations fall within the scope and spirit of the present invention which is not limited by the particular examples described above.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for identifying an RFID tag moving with an RFID reader, comprising:
   (a) transmitting by the reader over a period of time a plurality of reading signals, wherein said signals have a signal period;
   (b) receiving by the reader reply signals from any RFID tags within range of the reader;
   (c) determining for each reply:
      a particular RFID tag from which the reply was received; and
      a received signal strength from the RFID tag;
   (d) analyzing the received signal strengths and noting any consistencies of signal strengths correlated with the period of the signal period; and
   (e) determining from the consistencies whether the particular RFID tag is moving coherently with the RFID reader.

2. A method according to claim 1, further comprising determining whether the particular RFID tag consistently does not reply on a period basis which has the same period as the signal period.

3. The method of claim 1, wherein step (d) comprises:
   identifying a first read of the particular tag at a first time and a second read of the particular tag at a second time, wherein a time interval between the first read and the second read is an integer multiple of the signal period; and
   determining a degree to which the signal strength is substantially the same for the first read and the second read.

4. The method of claim 3, further comprising repeating the identifying step and the determining step for a plurality of pairs of first reads at first times and respective second reads at respective second times.

5. The method of claim 4, further comprising determining an aggregate level of consistency of signal strengths over a plurality of reads.

6. The method of claim 5, further comprising that if over the plurality of reads the degree of consistency exceeds a designated consistency threshold, then the RFID tag is moving coherently with the RFID reader.

7. The method of claim 1, further comprising:
   (f) determining over the period of time a distribution of reading signals for which the particular RFID tag is RF visible to the reader;
   (f) determining based on the distribution a probability that the particular RFID tag was in range of the reader from the beginning of the period of time to the end of the period of time; and
   (g) determining whether the particular RFID tag is moving coherently with the RFID reader based on both the consistencies and the probability.

8. The method of claim 1, further comprising:
   (f) determining a degree of correlation between received signal strengths and a plurality of respective frequencies of the read signals; and
   (g) determining whether the particular RFID tag is moving coherently with the RFID reader based on both the consistencies and the correlation.

9. A method for identifying an RFID tag moving with an RFID reader, comprising:
   (a) transmitting by the reader over a period of time a plurality of reading signals at a plurality of frequencies within a transmission band;
   (b) receiving by the reader reply signals from any RFID tags within range of the reader;
   (c) determining for each reply:
      a particular RFID tag from which the reply was received;
      a received signal strength from the RFID tag; and
      a frequency associated therewith;
   (d) analyzing the received signal strengths and noting any correlations of signal strengths with particular RFID tags and particular frequencies; and
   (e) determining from the correlations whether the particular RFID tag is moving coherently with the RFID reader.

10. A method according to claim 9, further comprising determining whether the particular RFID tag consistently does not reply at a particular frequency.

11. The method of claim 9, wherein step (d) comprises determining for a first read of the particular tag at a particular frequency and a second read of the particular tag at the particular frequency the degree to which the signal strength is the same or substantially the same for the first read and the second read.

12. The method of claim 9, wherein noting any correlations of signal strengths with particular RFID tags and particular frequencies comprises at least one of:
   determining a degree to which the particular RFID tag consistently does not reply at a particular frequency; and
   determining a degree to which the particular RFID tag consistently returns a substantially consistent signal strength at a particular frequency;
   wherein is determined a degree of correlation between the particular RFID tag and at least a frequency.

13. The method of claim 12, further comprising determining that if over the plurality of reading signals the correlation between the particular RFID tag and the at least a frequency exceeds a designated correlation threshold, then the RFID tag is moving coherently with the RFID reader.

14. The method of claim 13, further comprising determining that if over a plurality of frequencies the degree of correlation exceeds the designated correlation threshold, then the RFID tag is moving coherently with the RFID reader.

15. A method for identifying an RFID tag moving with an RFID reader, comprising:
   (a) transmitting by the reader over a period of time a plurality of reading signals at a plurality of frequencies within a transmission band;
   (b) receiving by the reader reply signals from any RFID tags within range of the reader;
   (c) determining over the plurality of reading signals a distribution of reading signals for which a specific RFID tag is within range of the reader; and
   (d) determining based on the distribution whether the particular RFID tag is moving coherently with the RFID reader.

16. The method of claim 15, further comprising:
   determining a percentage of the period of time when the particular RFID tag is in range of the reader; and
   determining based on the percentage and the distribution whether the particular RFID tag is moving coherently with the RFID reader.

17. The method of claim 15, further comprising:
   determining a degree to which the distribution is a substantially uniform distribution; and
   determining based on the degree to which the distribution is a substantially uniform distribution whether the particular RFID tag is moving coherently with the RFID reader.

18. The method of claim 15, further comprising:
   determining a particular frequency of the plurality of frequencies at which the particular RFID tag consistently does not reply at the particular frequency; and
   decreasing a weighting of reading signals at said particular frequency when determining the distribution.

19. A system for identifying an RFID tag moving with an RFID reader, comprising:
   the RFID reader, wherein said RFID reader is configured to transmit over a period of time a plurality of reading signals;
   an RF receiver associated with said RFID reader, wherein said RFID receiver is configured to receive reply signals from any RFID tags within range of the reader;
   a processor associated with said RFID reader, wherein said processor is configured to determine at least one of:
      any consistencies of a received signal strength from a particular RFID tag correlated with a period of the plurality of reading signals;
      a correlation between a signal strength received from the particular RFID tag and a particular frequency of the plurality of reading signals; and
      a distribution of reading signals for which the particular RFID tag is within range of the reader.

20. The system of claim 19, further comprising a signal strength measuring component associated with said RFID reader, said signal strength measuring component configured to determine the signal strength received from the particular RFID tag.

21. The system of claim 20, wherein said processor is further configured to determine whether the particular RFID tag is moving coherently with the RFID reader based on at least one of:
   the consistencies of the received signal strength from the particular RFID tag correlated with a period of the plurality of reading signals;
   the correlation between the signal strength received from the particular RFID tag and the particular frequency of the plurality of reading signals; and
   the distribution of reading signals for which the particular RFID tag is within range of the reader.

22. The system of claim 21, wherein said processor is further configured to determine whether the particular RFID tag is moving coherently with the RFID reader based on at least one of a plurality of consistencies and a plurality of correlations.

* * * * *

UNITED STATES PATENT AND TRADEMARK OFFICE
CERTIFICATE OF CORRECTION

PATENT NO. : 7,619,524 B2 Page 1 of 1
APPLICATION NO. : 11/781026
DATED : November 17, 2009
INVENTOR(S) : Calvarese It is certified that error appears in the above-identified patent and that said Letters Patent is hereby corrected as shown below:

IN THE SPECIFICATION

In Column 2, Line 9, after "or" delete "a".

In Column 3, Line 57, delete "RFD" and insert -- RFID --, therefor.

In Column 8, Line 41, delete "to," and insert -- $t_0$, --, therefor.

In Column 8, Line 64, delete "D3," and insert -- D31 --, therefor.

In Column 9, Line 15, delete "t0," and insert -- $t_0$, --, therefor.

In Column 9, Line 49, delete "420" and insert -- 420. --, therefor.

In Column 9, Line 57, delete "t0+P/2" and insert -- $t_0$+P/2 --, therefor.

In Column 9, Line 58, delete "t0+3P/2" and insert -- $t_0$+3P/2 --, therefor.

In Column 14, Line 41, delete "Time 1," and insert -- Time=1, --, therefor.

Signed and Sealed this

Eighth Day of June, 2010

David J. Kappos
*Director of the United States Patent and Trademark Office*